(12) United States Patent
Cook

(10) Patent No.: US 9,411,137 B2
(45) Date of Patent: Aug. 9, 2016

(54) ULTRA COMPACT INVERSE TELEPHOTO OPTICAL SYSTEM FOR USE IN THE IR SPECTRUM

(75) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 382 days.

(21) Appl. No.: 13/245,237

(22) Filed: Sep. 26, 2011

(65) Prior Publication Data

US 2013/0077157 A1    Mar. 28, 2013

(51) Int. Cl.
*G02B 13/04* (2006.01)
*G02B 13/14* (2006.01)
*G02B 13/18* (2006.01)

(52) U.S. Cl.
CPC .............. *G02B 13/04* (2013.01); *G02B 13/14* (2013.01); *G02B 13/18* (2013.01)

(58) Field of Classification Search
CPC ............ G02B 9/00; G02B 9/64; G02B 13/00; G02B 13/0005; G02B 13/001–13/002; G02B 13/0045; G02B 13/0055–13/006; G02B 13/008; G02B 13/04; G02B 13/06; G02B 13/14; G02B 13/146; G02B 13/16; G02B 13/18; H04N 5/33–5/332
USPC ................ 359/350–357, 642, 662, 708–719, 359/744–753, 761–762, 770, 781–783
See application file for complete search history.

(56) References Cited

U.S. PATENT DOCUMENTS

| | | | |
|---|---|---|---|
| 5,446,581 A | 8/1995 | Jamieson | |
| 6,236,501 B1 * | 5/2001 | Norrie | G02B 13/14 359/356 |
| 6,767,103 B2 | 7/2004 | Cook | |
| 6,989,537 B2 | 1/2006 | Cook | |
| 7,554,753 B2 * | 6/2009 | Wakamiya | G02B 13/06 359/708 |
| 7,733,581 B2 * | 6/2010 | Caldwell | 359/749 |
| 2004/0211907 A1 * | 10/2004 | Wellman | G01J 5/061 250/353 |
| 2005/0259330 A1 * | 11/2005 | Neil | 359/676 |
| 2013/0044221 A1 * | 2/2013 | Vizgaitis | G02B 13/146 348/164 |

FOREIGN PATENT DOCUMENTS

| | | |
|---|---|---|
| GB | 2 420 632 A | 5/2006 |
| JP | 2005-062559 A | 3/2005 |
| JP | 2005-173346 A | 6/2005 |
| WO | WO 01/35127 A1 | 5/2001 |

OTHER PUBLICATIONS

European Search Report and Opinion for European Application No. 12177629.8 in the name of Raytheon Company, European Search Report and Opinion dated Nov. 28, 2012 and mailed Dec. 5, 2012 (5 pgs.).

* cited by examiner

*Primary Examiner* — Stephone B Allen
*Assistant Examiner* — James McGee
(74) *Attorney, Agent, or Firm* — Lewis Roca Rothgerber Christie LLP

(57) ABSTRACT

An infrared imaging optical system for focusing infrared radiation on an infrared detector, including: a front lens group having a negative optical power to receive infrared radiation and including a first front lens and a second front lens each with at least one aspherical surface; an intermediate lens group that receives the infrared radiation from the front lens group and includes a first intermediate lens, a second intermediate lens, and a third intermediate lens each with at least one aspherical surface; and a rear lens group having positive optical power, wherein the rear lens group receives the infrared radiation from the intermediate lens group and includes a first rear lens and a second rear lens each with at least one aspherical surface, and a third rear lens, wherein the imaging optical system has a stop between the rear lens group and a focal plane at said infrared detector.

18 Claims, 5 Drawing Sheets

FIG. 2

| Surface | Description | Rd | CC | Ad | Ae | Af | Ag | Thickness | Material |
|---|---|---|---|---|---|---|---|---|---|
| 1 | Focus | Infin | | | | | | 6.898 | air |
| 2 | Stop | Infin | | | | | | 0.239 | air |
| 3 | Cyro-vac Window | Infin | | | | | | 0.290 | Ge |
| 4 | Cyro-vac Window | Infin | | | | | | 0.069 | air |
| 5 | Corrector Plate | Infin | | -4.57E-07 | -5.60E-06 | -1.45E-06 | 1.01E-07 | 0.290 | Ge |
| 6 | Corrector Plate | Infin | | | | | | 0.099 | air |
| 7 | Lens 53c | 357.031 | | | | | | 0.450 | GaAs |
| 8 | Lens 53c | -186.869 | | | | | | 0.231 | air |
| 9 | Lens 53b | -63.927 | | | | | | 0.550 | Si |
| 10 | Lens 53b | -28.183 | | -3.55E-04 | -1.08E-05 | 1.02E-08 | 6.83E-10 | 0.369 | air |
| 11 | Lens 53a | -9.7752 | | | | | | 0.400 | BaF2 |
| 12 | Lens 53a | -28.183 | | -3.49E-04 | 1.56E-05 | 4.40E-07 | 3.25E-08 | 0.896 | air |
| 13 | Lens 52c | 547.529 | | | | | | 0.600 | Si |
| 14 | Lens 52c | -58.511 | | -2.17E-05 | -9.99E-07 | 6.51E-10 | -4.33E-10 | 1.257 | air |
| 15 | Lens 52b | 98.406 | | 1.12E-04 | -1.84E-06 | 8.37E-08 | -1.08E-09 | 0.700 | Si |
| 16 | Lens 52b | -126.362 | | | | | | 1.159 | air |
| 17 | Lens 52a | 14.8916 | | | | | | 0.700 | Si |
| 18 | Lens 52a | 19.6267 | | 9.14E-05 | -2.36E-06 | 2.87E-08 | -1.37E-10 | 3.878 | air |
| 19 | Lens 51b | -6.3893 | | 7.80E-05 | -1.47E-06 | 5.96E-07 | -1.21E-08 | 0.500 | Si |
| 20 | Lens 51b | -7.4280 | | | | | | 0.322 | air |
| 21 | Lenx 51a | -8.3532 | 1.04842 | -2.99E-05 | -2.38E-07 | -2.18E-07 | 1.96E-11 | 0.580 | Si |
| 22 | Lens 51a | -9.9637 | | | | | | | air |

Stop diameter is 4.296 cm
Optical speed is F/1.61
FPA diagonal is 11.576 cm
FOV avg EFL is 7.48 cm
Entrance pupil is 4.466
Spectral band is 3.4 to 4.8 um
FOV diagonal is 89.4 deg
Total length = 20.5 cm
Length / EFL = 2.74
Stop Diam./Ent. Pupil Diam. = 0.96

FIG. 5

| Surface | Description | Rd | CC | Ad | Ae | Af | Ag | Thickness | Material |
|---|---|---|---|---|---|---|---|---|---|
| 101 | Focus | Infin | | | | | | 5.796 | air |
| 102 | Stop | Infin | | | | | | 0.157 | air |
| 103 | Cyro-vac Window | Infin | | | | | | 0.227 | Ge |
| 104 | Cyro-vac Window | Infin | | | | | | 0.161 | air |
| 105 | Corrector Plate | Infin | | -7.76E-04 | 6.38E-05 | -4.73E-05 | 1.18E-05 | 0.227 | Ge |
| 106 | Corrector Plate | Infin | | | | | | 0.101 | air |
| 107 | Lens 153c | 272.040 | | | | | | 0.350 | GaAs |
| 108 | Lens 153c | -166.336 | | | | | | 0.101 | air |
| 109 | Lens 153b | -70.490 | | | | | | 0.400 | Si |
| 110 | Lens 153b | -29.581 | | -7.43E-04 | 3.05E-05 | -3.89E-06 | 2.23E-06 | 0.177 | air |
| 111 | Lens 153a | -8.588 | | | | | | 0.350 | BaF2 |
| 112 | Lens 153a | -31.612 | | -3.82E-04 | 6.34E-05 | -1.72E-05 | -1.20E-06 | 0.677 | air |
| 113 | Lens 152c | 496.740 | | | | | | 0.500 | Si |
| 114 | Lens 152c | -62.307 | | -6.91E-05 | -4.25E-06 | -7.20E-07 | 1.41E-08 | 1.028 | air |
| 115 | Lens 152b | 101.037 | | 1.20E-04 | 9.30E-07 | 1.20E-07 | -9.00E-09 | 0.500 | Si |
| 116 | Lens 152b | -127.671 | | | | | | 0.079 | air |
| 117 | Lens 152a | 15.314 | | | | | | 0.500 | Si |
| 118 | Lens 152a | 20.631 | | 4.47E-05 | -5.37E-06 | 4.00E-08 | 1.79E-09 | 3.060 | air |
| 119 | Lens 151b | -6.768 | | 7.61E-05 | -1.81E-06 | 3.87E-07 | -2.33E-08 | 0.544 | Si |
| 120 | Lens 151b | -7.465 | | | | | | 0.050 | air |
| 121 | Lens 151a | -8.879 | 2.031923 | -8.36E-06 | -2.19E-06 | -4.18E-08 | -1.11E-08 | 0.544 | Si |
| 122 | Lens 151a | -9.803 | | | | | | | air |

Stop diameter is 1.932 cm
Optical speed is F/3.0
FPA diagonal is 11.314 cm
FOV avg EFL is 8.00 cm
Entrance pupil is 2.60
Spectral band is 3.4 to 4.8 um
FOV diagonal is 80.0 deg
Total length = 15.5 cm
Length / EFL = 1.94
Stop Diam./Ent. Pupil Diam. = 0.74

ULTRA COMPACT INVERSE TELEPHOTO OPTICAL SYSTEM FOR USE IN THE IR SPECTRUM

FIELD

The present invention is related to an infrared imaging optical system, and more particularly, to an inverse telephoto optical system that is highly compact.

BACKGROUND

In certain airborne wide area surveillance missions, particularly on board a small unmanned aerial vehicle ("UAV"), there are sensors positioned on the UAV that include infrared imaging optical systems used to image light in the infrared optical spectrum (from about 2 micrometers to about 7 micrometers), which is produced by hot objects such as engines, the human body, or missiles fired at the UAV, onto detectors. The detectors then convert the light into electrical signals that can be further analyzed.

These sensors may use an inverse-telephoto lens system, also known as a fisheye lens, because it allows the field of view to be very large. Further, the detectors in these systems must be cryogenically cooled, while the optical system is not. Therefore, these optical systems have external pupils (or stops) for the location of cold shield that surrounds only the cryogenically cooled detectors.

Previously, inverse telephoto optical systems have had physical length to effective focal length ratios in the 8× to 10× range. These are too large to fit the anticipated 10 inch to 12 inch diameter gimbals that can be employed on small UAV platforms. Further, these known systems employ large diameter lenses that are expensive to manufacture.

The size of the optical system is as important as the field of view ("FOV"), aperture (or stop), and focal length that the optical system is capable of providing. The availability of large two-dimension staring arrays with pixel counts up to 8,000 by 8,000 further emphasizes the need for very compact optical systems.

SUMMARY

An embodiment of the present invention provides a compact inverse-telephoto infrared imaging optical system having a wide field of view, a fast optical speed, and a small ratio of the physical length to the effective focal length ("EFL"). Aspects of an embodiment of the present invention are related to an inverse telephoto optical system with a physical length to effective focal length ratio that is about 2.74, and provides FOVs of about 90 degrees and optical speeds of about F/1.61 while operating in the mid-wavelength infrared ("MWIR") spectral band. The present inverse-telephoto infrared imaging optical system is therefore much smaller and lighter than previous systems.

Aspects of another embodiment of the present invention are related to an inverse telephoto optical system with a physical length to effective focal length ratio that is about 1.94, and provides FOVs of about 80 degrees and optical speeds of about F/3.0 while operating in the mid-wavelength infrared ("MWIR") spectral band.

An embodiment of the present invention provides an infrared imaging optical system for focusing infrared radiation on an infrared detector. The optical system includes: a front lens group having a negative optical power, wherein the front lens group receives an infrared radiation and includes a first front lens with at least one aspherical surface and a second front lens with at least one aspherical surface. The optical system also includes an intermediate lens group that receives the infrared radiation from the front lens group, wherein the intermediate lens group includes a first intermediate lens with at least one aspherical surface, a second intermediate lens with at least one aspherical surface, and a third intermediate lens with at least one aspherical surface. The optical system also includes a rear lens group having positive optical power, wherein the rear lens group receives the infrared radiation from the intermediate lens group, and wherein the rear lens group includes a first rear lens with at least one aspherical surface, a second rear lens with at least one aspherical surface, and a third rear lens. Further, the imaging optical system has a stop between the rear lens group and a focal plane located at said infrared detector, and a ratio of the physical length to the effective focal length may be less than about 3.0.

The optical system may further include a corrector plate between the third rear lens and the stop. The corrector plate may be a Schmidt corrector plate. The corrector plate may be formed of germanium.

The optical system may be optimized for operation in the 3.4 micron to 4.8 micron wavelength range. The first rear lens may be formed of barium fluoride. The third rear lens may be formed of gallium arsenide. The field of view may be about 90 degrees. The F/# may be about 1.6. The ratio of the physical length to effective focal length may be about 2.7. The field of view may be about 80 degrees.

The F/# may be about 3.0. The ratio of the physical length to the effective focal length may be about 1.94.

The optical system may further include a cryo-vac window between the third rear lens and the stop. The cryo-vac window may be formed of germanium. A ratio of the diameter of the stop to the diameter of an entrance pupil may be about 0.96. A ratio of the diameter of the stop to the diameter of an entrance pupil may be about 0.74. A ratio of the diameter of the stop to the diameter of an entrance pupil is less than about 1.0.

It should be appreciated that while certain embodiments can be optimized for performance in the MWIR, the principles and techniques utilized in this invention can be equally applied to embodiments optimized for performance in the LWIR spectrum, provided certain refractive materials changes appropriate to the LWIR spectral band are made. These materials changes are generally well known, such as the use of Si as the crown material of choice in the MWIR being replaced by Ge as the crown material of choice in the LWIR.

BRIEF DESCRIPTION OF THE DRAWINGS

FIG. 2 is an optical prescription for an embodiment of the present invention as shown in FIG. 1.

FIG. 5 is an optical prescription for an embodiment of the present invention as shown in FIG. 4.

DETAILED DESCRIPTION

An embodiment of the present invention provides an inverse telephoto optical system with a length-to-focal-length ratio that is about 2.7, and provides a FOV of about 90 degrees and an optical speed of about F/1.6 while operating in the mid-wavelength infrared ("MWIR") spectral band. Here, the choice of material, number and location of various lenses, the use of aspheric lenses, and the employment of relatively low pupil magnifications (e.g., values in the region of 1.0×) make the short length of the optical system possible. The present invention may be utilized with respect to ground intelligence surveillance and reconnaissance systems ("GISR") and other wide area surveillance efforts from airborne or UAV platforms (e.g., with about a twelve foot wingspan) to detect infrared radiation.

Figure 1:
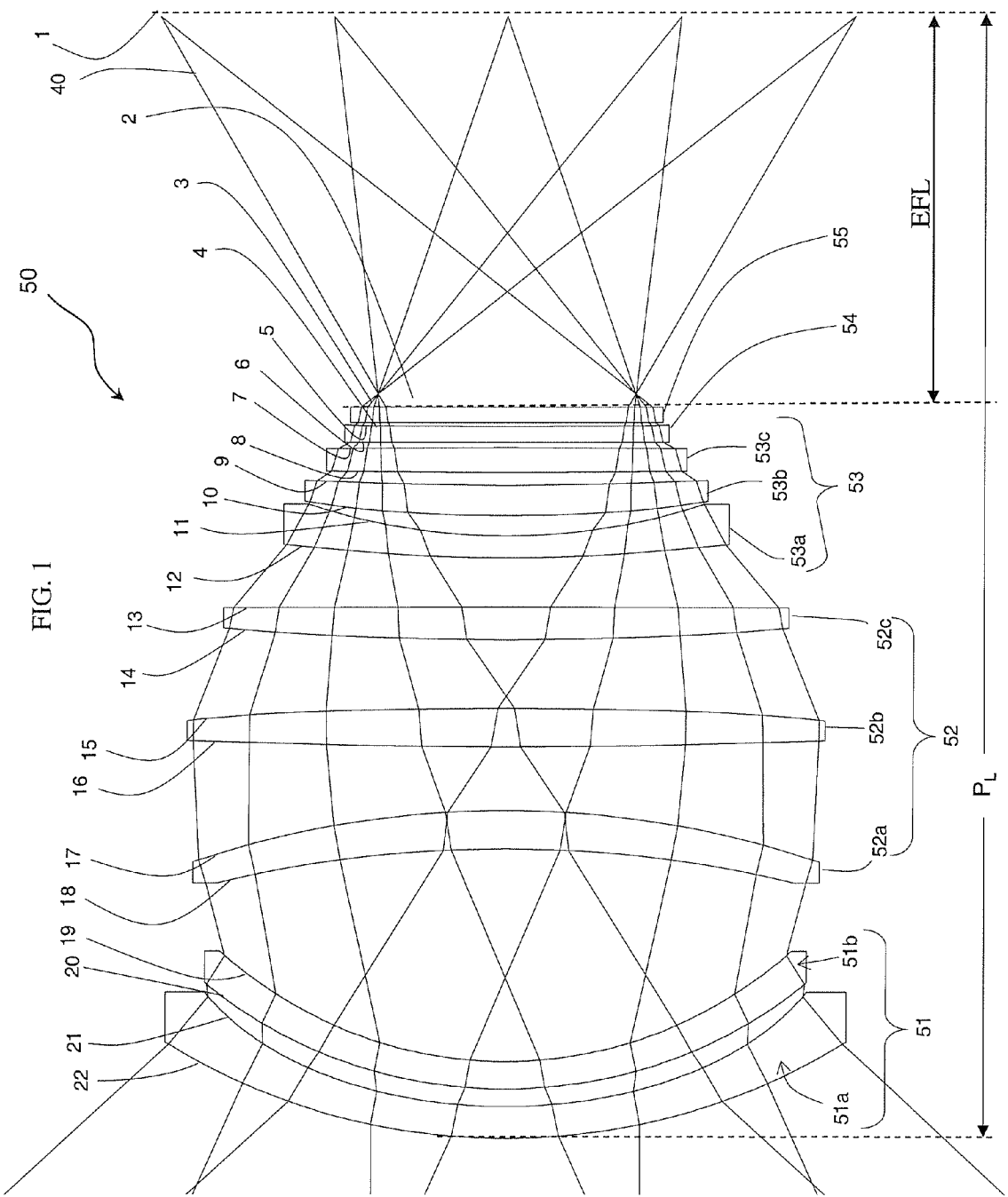
FIG. 1 is schematic view of an optical system according to an embodiment of the present invention.

FIG. 1 shows an infrared imaging optical system 50 according to an embodiment of the present invention. FIG. 2 is an optical prescription for an embodiment of the present invention as shown in FIG. 1. It is generally known that certain wide field of view optical systems are best and routinely raytraced backwards, from the image plane out into object space. As the light path is completely reversible, this presents no physical problem, and it routinely avoids certain mathematical ray aiming convergence problems that most raytrace codes are prone to in wide field of view situations. Thus, the optical prescriptions of FIGS. 2 and 5 are in the reverse order of the actual propagation of light. Here, the optical system 50 includes a front lens group 51, an intermediate lens group 52, and a rear lens group 53. The front lens group 51 receives infrared radiation and directs it onto the intermediate lens group 52. The intermediate lens group receives the infrared radiation from the front lens group 51 and directs it onto the rear lens group 53. The rear lens group 53 receives the infrared radiation from the intermediate lens group 52 and directs it onto an infrared detector, which is located at the focus 1 (or focal plane) of the lens system 50.

The infrared detector may be a focal plane array ("FPA") that detects infrared radiation with wavelengths in a range from about 3.4 microns to about 4.8 microns, which are known in the art. The infrared radiation detector converts the incident infrared radiation into a signal to be analyzed by image analysis electronics, which are also known in the art. However, this type of detector typically operates most effectively at cryogenic temperatures of about 77K, so the detector would be located in a vacuum dewar, which serves as a cold shield. An opening of the cold shield is located at a cryo-vac window 55. A stop 2 is located just beyond the cryo-vac window 55 so that the stop is inside the vacuum dewar to reduce the likelihood that the detector will detect energy from the lens surfaces or other components.

The front lens group 51 includes a first front lens 51a and a second front lens 51b. Infrared radiation is incident on a first surface 22 of the first front lens 51a and passes out through a second surface 21, which is aspheric, of the first front lens 51a to a first surface 20 of the second front lens 51b. The infrared radiation then passes out of the second front lens 51b through a second surface 19 of the second front lens 51b to the intermediate lens group 52.

The intermediate lens group 52 includes a first intermediate lens 52a, a second intermediate lens 52b, and a third intermediate lens 52c. The infrared radiation from the second surface 19, which is aspheric, of the second front lens 51b is incident on a first surface 18, which is aspheric, of the first intermediate lens 52a and passes out through a second surface 17 of the first intermediate lens 52a to a first surface 16 of the second intermediate lens 52b. The infrared radiation then passes out of the second intermediate lens 52b through a second surface 15, which is aspheric, of the second intermediate lens 52b to a first surface 14, which is aspheric, of a third intermediate lens 52c. The infrared radiation then passes out of the third intermediate lens 52c through a second surface 13 of the third intermediate lens 52c to the rear lens group 53.

The rear lens group 53 includes a first rear lens 53a, a second rear lens 53b, and a third rear lens 53c. The infrared radiation from the second surface 13 of the third intermediate lens 52c is incident on a first surface 12, which is aspheric, of the first rear lens 53a and passes out through a second surface 11 of the first rear lens 53a to a first surface 10, which is aspheric, of the second rear lens 53b. The infrared radiation then passes out of the second rear lens 53b through a second surface 95 of the second rear lens 53b to a first surface 8 of a third rear lens 53c. The infrared radiation then passes out of the third rear lens 53c through a second surface 8 of the third rear lens 53c to a first surface 6 of a corrector plate 54.

The infrared radiation passes through the corrector plate 54, the cryo-vac window 55, a and a stop 2, before the infrared radiation is incident on the detector located at a focus 1. Here, the infrared radiation then passes out of the corrector plate 54 through a second surface 5 of the corrector plate 54 to a first surface 4 of the cryo-vac window 55.

In an embodiment of the present invention 54, the corrector plate 54 may be a Schmidt corrector plate to correct for spherical aberration. For example, a Schmidt corrector plate is an aspheric lens which is designed to correct spherical aberration. Here, the second surface 5 of the corrector plate 54 has an aspheric surface.

The infrared radiation then passes out of the cryo-vac window 55 through a second surface 3 of the cryo-vac window 55 and through a stop 2. The stop 2 allows some of the infrared radiation to pass through an open central region of the stop 2, and this infrared radiation is incident on the detector located at the focus 1.

The detector detects the incident infrared radiation, and information based on this detected infrared radiation is converted to an electrical signal which may be further processed by other electronics.

The optical system 50 is an "inverse-telephoto lens group" such that the front lens group 51 has a negative optical power and the rear lens group 53 has a positive optical power. This combination of optical powers allows the optical system 50 to function in the "fisheye" manner, with a very wide field of view in both the azimuth and elevation. Here, there is some distortion of the image on the infrared detector, but that distortion is acceptable for the applications of interest in return for the very wide angle of view.

In an embodiment according to the optical prescription shown in FIG. 2, the stop diameter is about 4.296 cm, the optical speed is about F/1.61, the diagonal dimension of the focal plane array ("FPA") of the detector is about 11.576 cm, the FOV average effective focal length ("EFL") is about 7.48 cm, the entrance pupil is about 4.466 cm, the spectral band of operation is about 3.4 microns to about 4.8 microns, the FOV diagonal is about 89.4 degrees, the total length from the first surface 22 of the first front lens 51a to the focus 1 is about 20.5 cm, the ratio of the stop diameter to the entrance pupil diameter is about 0.96, and the ratio of the physical length $P_L$ to the EFL is about 2.74. Here, the physical length $P_L$ is the distance from the outwardly facing surface of the front lens to the image plane.

Figure 3:
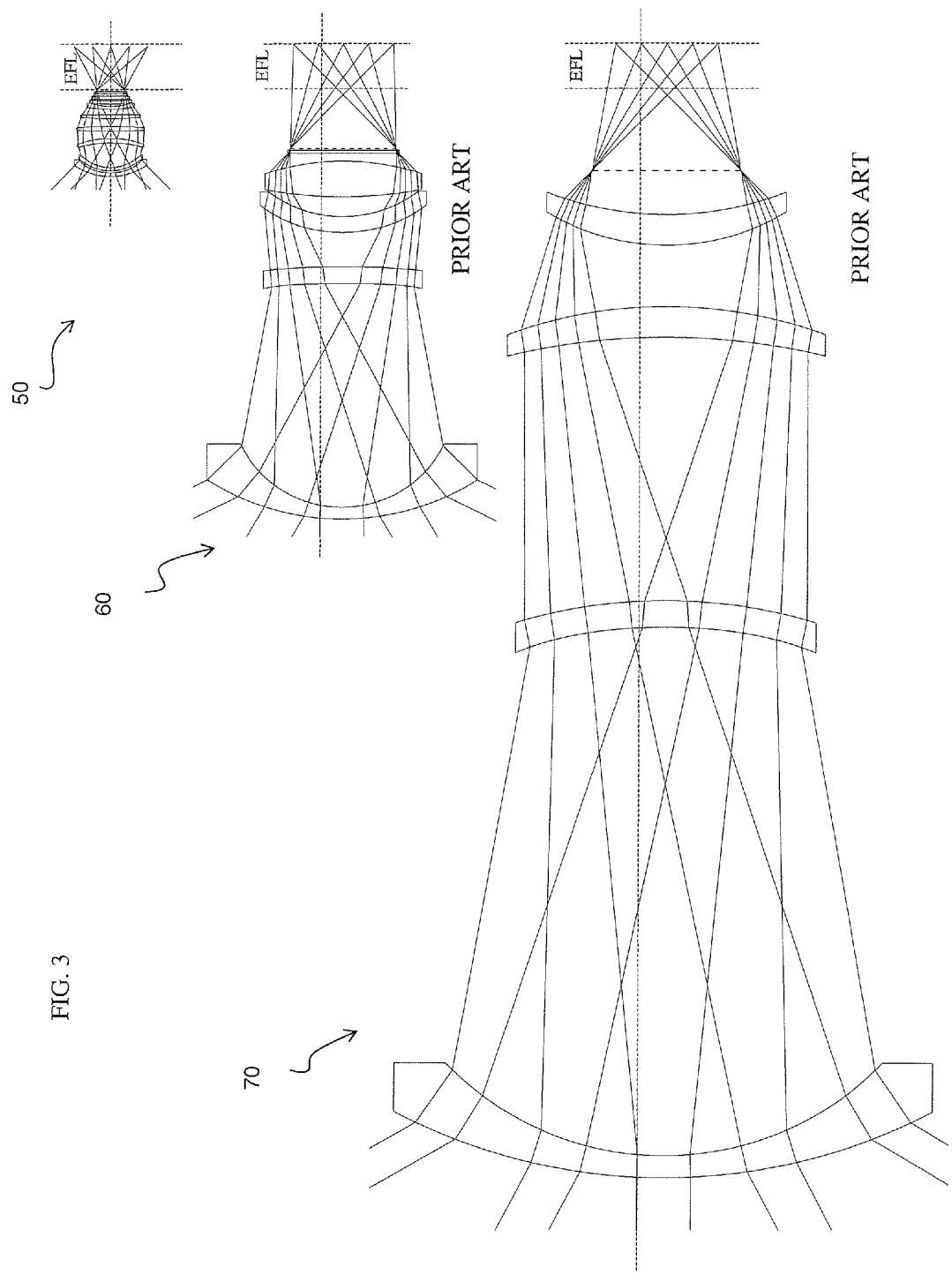
FIG. 3 is a schematic view of the optical system of FIG. 1 and two other prior art optical systems, all in the same scale.

FIG. 3 is a schematic view of the optical system 50 of FIG. 1 and two previous optical systems 60 and 70, all in the same scale and with a common EFL. As shown in FIG. 3, the optical system of the present invention is much shorter in physical length than previous optical systems.

Optical system 60, described in U.S. Pat. No. 6,989,537 to Cook, the entire content of which is incorporated by reference, has an FOV of 120 degrees, F/1.0 while operating in the long-wavelength infrared spectral band, and a ratio of physical length to EFL of 9.9. Optical system 70, described in U.S.

Pat. No. 5,446,581 to Jamieson, has an FOV of 120 degrees with F/1.0 while operating in the long-wavelength infrared spectral band, and a ratio of physical length to EFL of 24.9.

Embodiments of the optical system of the present invention utilize more lenses, including more aspheric lenses, than previous optical systems, and the lenses of the present optical system are formed of different materials than the previous optical systems. The present approach yielded surprising and unexpected results, since the present optical system achieves a small ratio of physical length to effective focal length as compared to previous optical systems. Further, the ratio of the size of entrance pupil to the size of aperture stop (i.e., the pupil magnification) is about 1.0 in the optical system of the present invention, as compared to much smaller ratios in previous optical systems.

However, because the pupil magnification is about unity or 1.0, the angle of incidence of the infrared radiation on the focus in the present optical system may be much larger (0 to about 45 degrees) than in previous optical systems. Therefore, different anti-reflection coatings on detector may be required.

As can be seen in FIG. 3, the diameters of the lenses in the present optical system 50 are smaller than those of the previous optical systems 60 and 70. Therefore, the length of the required support structure is smaller, leading to reduced weight and size, which are important advantages for UAV applications.

The reduced weight and size are achieved without a significant loss in optical performance. While the total transmission or throughput of the optical system is slightly reduced due to the greater number of lenses used, the quality of the wavefront, as measure by the RMS wavefront error or departure, is comparable to that of optical designs in the prior art.

The advantages of the present optical system primarily result from the use of alternative optical materials for the construction of the lenses, and from the selective use of aspheric surfaces for some of the lenses.

The lenses of the optical system 50 are preferably formed of infrared radiation transparent material. In an embodiment, the first front lens 51a, the second front lens 51b, the first intermediate lens 52a, the second intermediate lens 52b, the third intermediate lens 52c, and the second rear lens 53b are formed of silicon.

In an embodiment, the first rear lens 53a is formed of barium fluoride. In an embodiment, the third rear lens 53c is formed of gallium arsenide.

In an embodiment, the corrector plate 54 and the cryo-vac window are formed of germanium.

Figure 4:
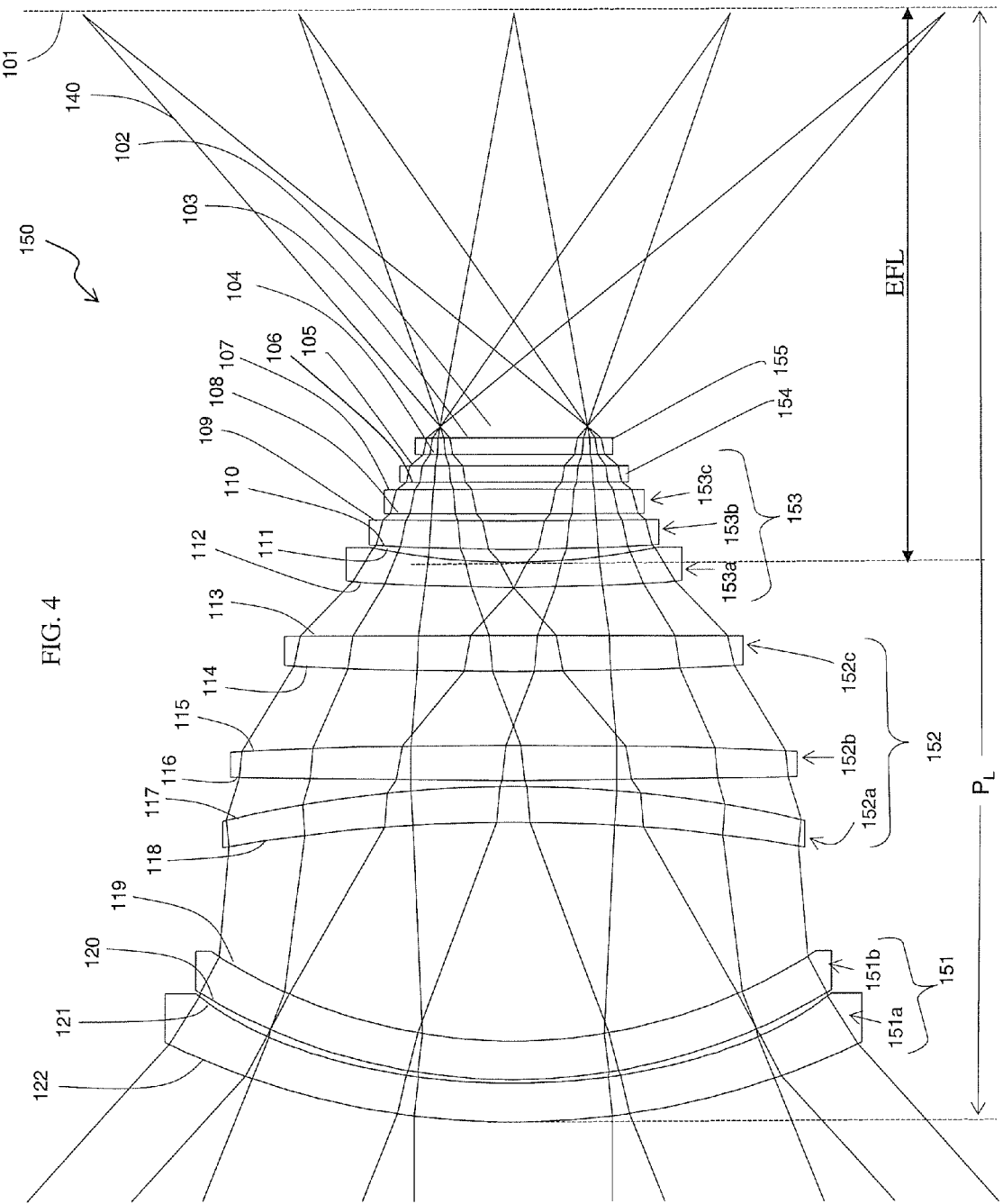
FIG. 4 is a schematic view of an optical system according to another embodiment of the present invention.

In another embodiment of the present invention shown in FIG. 4, an inverse telephoto optical system 150 has a physical length to EFL ratio that is about 1.94, and provides FOVs of about 80 degrees and optical speeds of about F/3.0 while operating in the MWIR spectral bands. FIG. 5 is an optical prescription for an embodiment of the present invention as shown in FIG. 4. The optical system 150 includes a front lens group 151, an intermediate lens group 152, and a rear lens group 153. The front lens group 151 receives infrared light and directs it onto the intermediate lens group 152. The intermediate lens group receives the infrared light from the front lens group 151 and directs it onto the rear lens group 153. The rear lens group 153 receives the infrared light from the intermediate lens group 152 and directs it onto an infrared detector, which is located at the focus 1 (or focal plane) of the lens system 150. The lenses of the optical system 150 are preferably formed of infrared transparent material.

The front lens group 151 includes a first front lens 151a and a second front lens 151b. Infrared radiation is incident on a first surface 122 of the first front lens 151a and passes out through a second surface 121, which is aspheric, of the first front lens 151a to a first surface 120 of the second front lens 151b. The infrared radiation then passes out of the second front lens 151b through a second surface 119, which is aspheric, of the second front lens 151b to the intermediate lens group 152.

The intermediate lens group 152 includes a first intermediate lens 152a, a second intermediate lens 152b, and a third intermediate lens 152c. The infrared radiation from the second surface 119 of the second front lens 151b is incident on a first surface 118, which is aspheric, of the first intermediate lens 152a and passes out through a second surface 117 of the first intermediate lens 152a to a first surface 116 of the second intermediate lens 152b. The infrared radiation then passes out of the second intermediate lens 152b through a second surface 115, which is aspheric, of the second intermediate lens 152b to a first surface 114, which is aspheric, of a third intermediate lens 152c. The infrared radiation then passes out of the third intermediate lens 152c through a second surface 113 of the third intermediate lens 152c to the rear lens group 153.

The rear lens group 153 includes a first rear lens 153a, a second rear lens 153b, and a third rear lens 153c. The infrared radiation from the second surface 113 of the third intermediate lens 152c is incident on a first surface 112, which is aspheric, of the first rear lens 153a and passes out through a second surface 111 of the first rear lens 153a to a first surface 110, which is aspheric, of the second rear lens 153b. The infrared radiation then passes out of the second rear lens 153b through a second surface 109 of the second rear lens 153b to a first surface 107 of a third rear lens 153c. The infrared radiation then passes out of the third rear lens 53c through a second surface 108 of the third rear lens 153c to a first surface 106 of a corrector plate 154.

The infrared radiation passes through the corrector plate 154, the cryo-vac window 155, and a stop 102, before the infrared radiation is incident on the detector located at a focus 101. Here, the infrared radiation then passes out of the corrector plate 154 through a second surface 105, which is aspheric, of the corrector plate 154 to a first surface 104 of the cryo-vac window 155. The infrared radiation then passes out of the cryo-vac window 155 through a second surface 103 of the cryo-vac window 155 and through a stop 102. The stop 102 allows some of the infrared radiation to pass through an open central region, and this infrared radiation is incident on the detector located at the focus 101.

In an embodiment according to the optical prescription shown in FIG. 2, the stop diameter is about 1.932 cm, the optical speed is about F/3.0, the diagonal dimension of the focal plane array ("FPA") of the detector is about 11.314 cm, the FOV average effective focal length ("EFL") is about 8.00 cm, the entrance pupil is about 2.60 cm, the spectral band of operation is about 3.4 microns to about 4.8 microns, the FOV diagonal is about 80.0 degrees, the total length from the first surface 122 of the first front lens 151a to the focus 101 is about 15.5 cm, the ratio of the physical length $P_1$, to the EFL is about 1.94, and the ratio of the stop diameter to the entrance pupil diameter is about 0.74.

Although the present invention has been described and illustrated in respect to exemplary embodiments, it is to be understood that it is not to be so limited, and changes and modifications may be made therein which are within the full intended scope of this invention as hereinafter claimed.

What is claimed is:

1. An infrared imaging optical system for focusing infrared radiation on an infrared detector, the imaging optical system comprising:

a front lens group having a negative optical power, wherein the front lens group is configured to receive infrared radiation and comprises a first front negative meniscus lens with at least one aspherical surface and a second front negative meniscus lens with at least one aspherical surface;

an intermediate lens group that is configured to receive the infrared radiation from the front lens group, wherein the intermediate lens group comprises a first intermediate lens with at least one aspherical surface, a second intermediate lens with at least one aspherical surface, and a third intermediate lens with at least one aspherical surface;

a rear lens group having positive optical power, wherein the rear lens group is configured to receive the infrared radiation from the intermediate lens group, and wherein the rear lens group comprises a first rear lens with at least one aspherical surface, a second rear lens with at least one aspherical surface, and a third rear lens; and the infrared detector, wherein the infrared detector is configured to detect at least the infrared radiation with wavelengths in a range from about 3.4 microns to about 4.8 microns or wavelengths in a long-wavelength infrared spectral band; and wherein the imaging optical system has an aperture stop between the rear lens group and a focal plane located at said infrared detector;

wherein, when the imaging optical system receives the infrared radiation, the imaging optical system produces only a single image, the single image being located at the infrared detector; and wherein the imaging optical system has a physical length and an effective focal length and wherein a ratio of the physical length to the effective focal length is less than about 3.0.

2. The optical system of claim 1, wherein the ratio of the physical length to the effective focal length is about 2.7.

3. The optical system of claim 1, wherein the ratio of the physical length to the effective focal length is about 1.94.

4. The optical system of claim 1, wherein the imaging optical system has a field of view of about 80 degrees.

5. The optical system of claim 1, wherein the imaging optical system has a field of view of about 90 degrees.

6. The optical system of claim 1, wherein the imaging optical system has an F/# of about 3.0.

7. The optical system of claim 1, wherein the imaging optical system has an F/# of about 1.6.

8. The optical system of claim 1, wherein a ratio of a diameter of the stop to a diameter of an entrance pupil is less than about 1.0.

9. The optical system of claim 1, wherein a ratio of a diameter of the stop to a diameter of an entrance pupil is about 0.96.

10. The optical system of claim 1, wherein a ratio of a diameter of the stop to a diameter of an entrance pupil is about 0.74.

11. The optical system of claim 1, wherein the first rear lens comprises barium fluoride.

12. The optical system of claim 1, wherein the third rear lens comprises gallium arsenide.

13. The optical system of claim 1, wherein the optical system is configured to detect infrared radiation with wavelengths in the range from about 3.4 microns to about 4.8 microns.

14. The optical system of claim 1, further comprising a cryo-vac window between the third rear lens and the stop.

15. The optical system of claim 14, wherein the cryo-vac window comprises germanium.

16. The optical system of claim 1, further comprising a corrector plate between the third rear lens and the stop.

17. The optical system of claim 16, wherein the corrector plate is a Schmidt corrector plate.

18. The optical system of claim 16, wherein the corrector plate comprises germanium.

* * * * *